Oct. 22, 1968 J. V. CULL 3,407,264

CIRCUIT MARKER GUARD

Filed Feb. 2, 1967 2 Sheets-Sheet 1

John V. Cull

INVENTOR.

BY Clarence A. O'Brien and Harvey B. Jacobson

Attorneys

Oct. 22, 1968 J. V. CULL 3,407,264

CIRCUIT MARKER GUARD

Filed Feb. 2, 1967 2 Sheets-Sheet 2

John V. Cull

INVENTOR.

BY Clarence A. O'Brien and Harvey B. Jacobson

Attorneys

United States Patent Office 3,407,264
Patented Oct. 22, 1968

3,407,264
CIRCUIT MARKER GUARD

John V. Cull, % Crown Design & Manufacturing Corp., P.O. Box 7342, Dallas, Tex. 75209
Filed Feb. 2, 1967, Ser. No. 613,589
10 Claims. (Cl. 174—138)

ABSTRACT OF THE DISCLOSURE

A protective guard and circuit marker constructed of distinctively colored, heat resistant, resilient dielectric material such as plastic employed in conjunction with the terminals on terminal blocks in a central switching station of a telephone system. The circuit marker and guard includes a plurality of interconnected split sleeves of any suitable shape to slide into enclosing relation to a plurality of terminals with wires connected to the terminals extending through the slits in the split sleeves.

The present invention generally relates to a circuit marker guard and generally relates to a protective guard and also a novel method for marking special circuits in the central switching station of telephone systems.

As is well known in the communication field and specifically in telephone systems, communication lines are interconnected in a central switching station. Incoming communication lines are connected to terminal blocks with the lines from the switching equipment also being connected to these terminal blocks so that the terminal blocks function to connect the switching equipment to the accompanying lines.

The terminal blocks are mounted on a frame such that they are end-to-end and extend for relatively long distances in a horizontal plane. The rows of terminal blocks are placed one row above the other from a point near the floor to a point near the ceiling of the switching room. This arrangement is commonly known as a horizontal frame in the central switching stations. In a similar manner, a vertical frame is sometimes used which is made up of terminal blocks placed end to end from a point near the floor to a point near the ceiling with the vertical rows of terminal blocks being located close to each other in a manner similar to the rows of horizontal blocks. Due to the close spacing of the rows of terminals on the blocks, the circuit marker guard of the present invention solves the problem of protectively covering the terminals and at the same time marking special circuits.

As is also well known, terminal blocks are made up of rows and columns of terminals with the number of terminals on any one block varying widely from approximately forty terminals to one hundred sixty terminals more or less with the most popular terminal block having one hundred and twenty terminals thereon. The most common arrangement of the terminals is six rows by twenty columns of terminals in a rectangular pattern. The terminals actually extend through the dielectric portion of the terminal block making them available for connection to each other or to incoming wiring. The circuit marker guard of the present invention is employed on the cross connect side of a terminal block. The cross connect side of the terminal block is identified in the telephone industry as the side of the block opposite the permanently wired cable side of the terminal block. During periods in which workmen are active around these frames, the terminals are subject to being damaged, bent, shorted to adjacent terminals and the wires sometimes are broken.

It is an object of the present invention to provide a circuit marker guard which protects the terminals from being damaged and the workman from being injured. The circuit marker guard is constructed of a heat resistant, flame-proof, resilient dielectric material and snaps firmly and solidly on the existing terminals either horizontally or vertically, with no modification to the terminal blocks, frame or terminals. The guard prevents solder splash or shorting between the terminals with metallic objects and tools during a workman's activity on adjacent terminals. The circuit marker guard is constructed in a slightly contoured manner on one side to provide maximum space between rows of terminals to facilitate work on the adjacent terminals. The construction of the guard also insures proper fit on unprotected underground type and other similar cable distributing frame terminals.

Another object of the present invention is to provide a circuit marker guard constructed in different heights and sizes to fit on groups of terminals which may be varied in type, size, spacing and height. The construction of the guard enables the guard to fit over the terminals which have different spaces and terminals which may be bent or misaligned with the contour permitting limited expansion thereof.

A further object of the present invention is to provide a circuit marker guard which may be constructed of plastic material having a particular color such as red which will provide immediate identification of special circuits such as radio, television, government circuits, and the like.

Still another object of the present invention is to provide a circuit marker guard constructed in a manner so that it will not roll when dropped onto the floor as occurs with the presently available guards which are in the form of rather rigid split tubular phenolic members. Also, the guard of the present invention will replace three parts formerly used to protect and mark two terminals forming a circuit. Previously, two split phenolic tubes and a red washer encircling the wires were employed to mark a circuit. However, the single piece forming the circuit marker guard of the present invention will replace the split phenolic tubes and the red washer employed around the wires connected to the terminals.

Still another important object of the present invention is to provide a circuit marker guard having a notch cut in each end thereof communicating with the entrance slit so that the marker unit can be placed either way on the terminals which is necessary to allow for an opening on either side of the terminals inasmuch as some wiring is wrapped around this terminal in a clockwise direction while some wiring is wrapped around the terminal in a counterclockwise direction.

The circuit marker guard may be constructed of a dielectric flame-proof plastic material such as red and substantially rigid polyvinyl carbonate material or the like which not only marks special circuits but also is easy to locate with it being pointed out that other colors may be employed as deemed appropriate. Inasmuch as this marker guard is to be used for all paired circuits, it will eliminate the possibility of a workman failing to mark one of the terminals in a given pair which sometimes occurs when single tubular split phenolic markers are employed. The installation time and removal time is much quicker by employing the circuit marker guard of the present invention as compared with the two phenolic tubes and the washer as is present-day customary practice.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
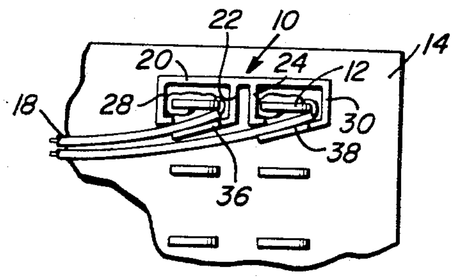
FIGURE 1 is a plan view illustrating a circuit marker guard installed on a pair of terminals on a terminal block.

Referring now specifically to the drawings, the numeral 10 generally designates the circuit marker guard of the present invention which is employed for mounting on a pair of terminals 12 carried by a terminal block 14 of dielectric material such as is employed in the central switching station of telephone systems. As is well known, the terminals 12 extend through the terminal block 14 with the terminals on one side of the block 14 having permanent wires 16 attached thereto and the terminals 12 on the side of the block 14 on which the circuit marker guards 10 are installed having cross-connect wiring 18 connected thereto all in a conventional and well-known manner.

Figure 4:
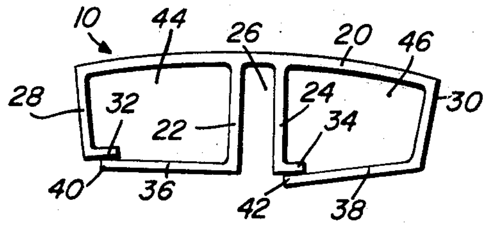
FIGURE 4 is a plan view or end view of a circuit marker guard.
Figure 2:
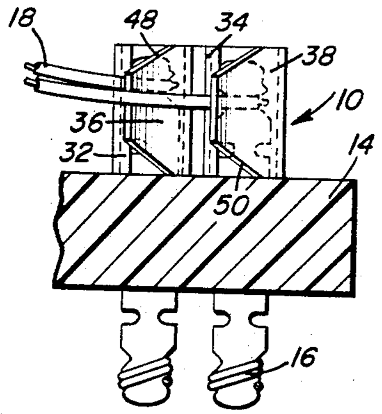
FIGURE 2 is an elevational view of the construction of FIGURE 1 illustrating the manner in which the lines extend through the entrance area defined by the circuit marker guard.
Figure 3:
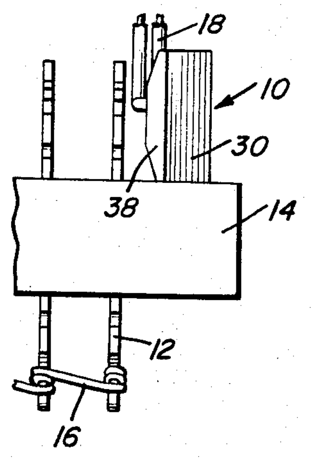
FIGURE 3 is an edge view of the assembly of FIGURE 1.
Figure 5:
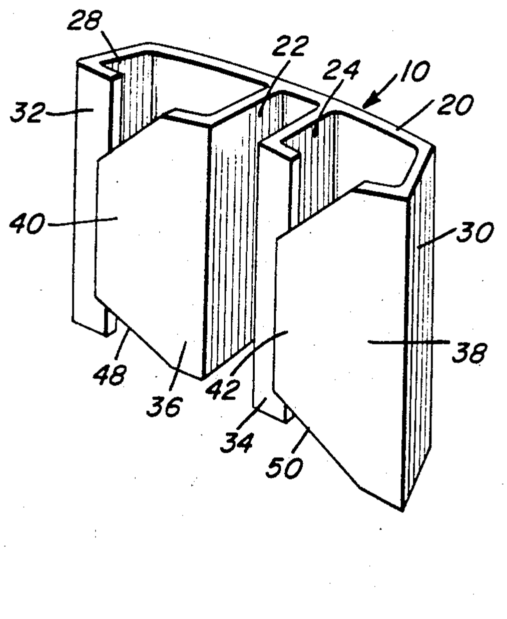
FIGURE 5 is a perspective view of the circuit marker guard.
Figure 6:
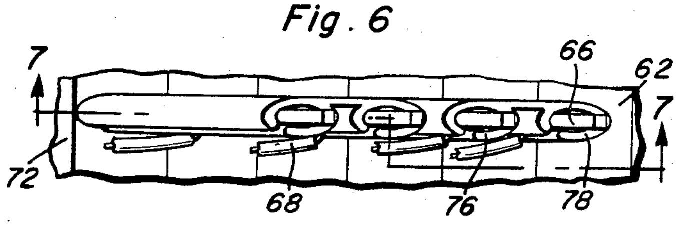
FIGURE 6 is a plan view of another embodiment of the circuit marker guard for use with inclined wire wrap terminals.

The circuit marker guard 10 includes a wall or panel 20 which is slightly arcuately curved with a slightly convex outer surface and a slightly concave inner surface. The wall 20 is relatively thin and has a degree of flexibility but is shape sustaining and substantially rigid as well as generally rectangular with the width of the wall being generally equal to the over-all width of two adjacent terminals as illustrated in FIGURE 1. The height of the wall 20 is generally equal to or slightly more than the height of the terminals 12 and inasmuch as the terminals 12 are of different heights, the height of the guard including the wall 20 may also be provided in various standard lengths. Extending from the concave surface of the wall 20 adjacent the center thereof and in spaced relation is a pair of walls 22 and 24 which are generally in spaced parallel relation to each other with the space therebetween being designated by numeral 26 to facilitate flexing of the wall 20 and other components of the guard. The outer edges of the wall 20 includes projecting walls 28 and 30 which converge slightly toward each other and slightly toward the walls 22 and 24. The free edge of the inclined wall 28 is provided with an inwardly projecting lip 32 and the free edge of the wall 24 is provided with a similar laterally projecting lip 34 both of which extend into the same direction. The free edge of the wall 22 is provided with a laterally projecting flange 36 and the free edge of the wall 30 is provided with a similar laterally projecting flange 38. As illustrated in FIGURES 4 and 5, the free edge of the flange 36 designated by numeral 40 overlaps the outer surface of the inwardly projecting lip 32 while the free edge 42 of the flange 38 overlaps the corresponding lip 34 thus forming an entrance area for generally hollow passageways 44 and 46 defined by the walls, lips and flanges. As illustrated in FIGURE 4, the walls 22 and 24 are slightly wider than the converging or inclined walls 28 and 30 so that the flanges 36 and 38 are slightly at different angles to facilitate their placement over the terminals 12 so that the cross-connect wires 18 may extend out between the overlapping lips and flanges as illustrated in FIGURE 1 with the flanges 36 and 38 being deflected slightly outwardly to accommodate the wires 18.

As illustrated in FIGURE 5, the flange 36 has beveled free corner edges 48 and the flange 38 has correspondingly beveled free corner edges 50 at each end thereof for facilitating assembly of the guard onto the terminals. The inclined surfaces 48 and 50 will form a camming engagement with the wires 18 so that the flanges 36 and 38 will be biased outwardly and deflected outwardly so that they may pass downwardly over the outer surface of the wires 18 when the guard is inserted over the top ends of the terminals 12 and forced vertically downwardly. The outward flexing of the flanges 36 and 38 also provides a frictional gripping engagement of the wires 18 between the lips and flanges as clearly illustrated in FIGURE 1 thus serving to securely hold the circuit marker guard 10 in position on the terminals 12.

The flexible plastic material and expandable construction provides for easy installation of the guard and further provides a firm grip on the terminals when installed but still enables easy removal thereof when desired. The guard which is of one-piece and protects two terminals is held in place by the combined gripping action on two wires and also completely eliminates the possibility of a workman failing to mark one of the terminals in a given pair. The spacing between the walls 22 and 24 provides sufficient flexibility to enable the passages through the guard to fit pairs of terminals 12 with different spacings. When the terminal guard is placed in position, the wall 20 will be substantially flat thus allowing more room between the rows of terminals and further facilitating gripping action on the terminals due to the tendency of the wall 20 to assume its normal position thereby causing the inner surfaces of the walls 28 and 30 to frictionally grip the terminals or wires thereon. The rectangular configuration of the guard provides flat surfaces so that it will not roll when it is dropped or laid on an inclined surface or even when it is dropped onto a floor or the like. As compared with presently employed split tubes of substantially rigid phenolic material which are cylindrical, the present guard enables a workman to much more rapidly install a terminal guard since only one piece is employed and by employing a desired marking color, there is no necessity of subsequently employing a colored washer in encircling relation to the wires of a pair of terminals which is the present conventional practice.

FIGURES 6–10 illustrate another embodiment of the circuit marker guard generally designated by numeral 60 which is associated with a terminal block 62 of dielectric material having terminals 64 associated therewith in a conventional manner. The terminals 64 are each provided with an outwardly inclined end portion 66 and having connecting wires 68 connected thereto by a conventional wire wrap 70. When the circuit marker guard 60 is employed, the wiring will extend back through holes provided in the base portion or mounting portion 72 of the terminal block.

Figure 9:
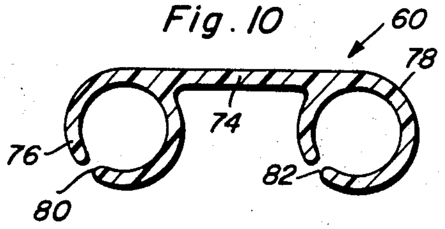
FIGURE 9 is a perspective view of the circuit marker guard.
Figure 10:
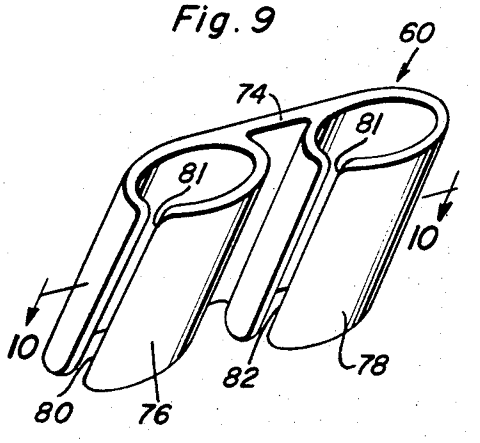
FIGURE 10 is a sectional view taken along section line 10—10 of FIGURE 9.

As illustrated specifically in FIGURES 9 and 10, the circuit marker guard 60 includes a connecting wall or panel 74 having a cylindrical tubular member 76 at one edge thereof and a cylindrical tubular member 78 at the other edge thereof with the panel 74 being substantially tangential to the cylindrical members 76 and 78. The cylindrical member 76 is provided with a longitudinal split or slit 80 therein and a similar split or slit 82 is provided in the cylindrical member 78 with it being pointed out that the slits are formed longitudinally throughout the length of the tubular members and have rounded edges or flared corners 81 at either or both ends thereof to facilitate insertion over the upper end portion 66 of the terminal 64 and to facilitate reception of the wires in the slits or splits 80 and 82.

Figure 7:
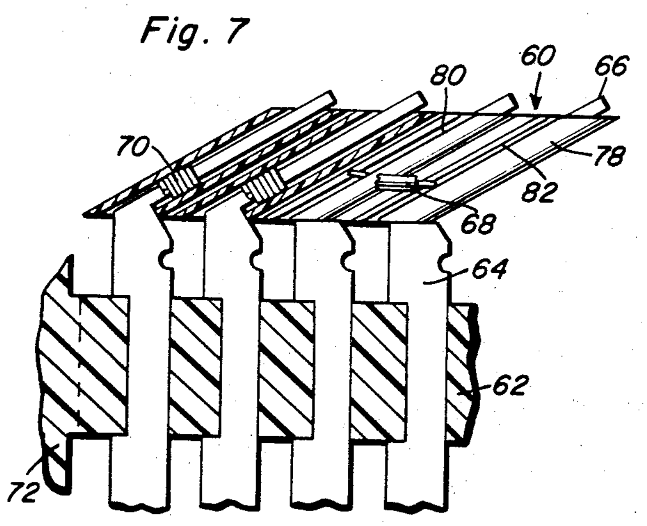
FIGURE 7 is a sectional view taken along section line 7—7 of FIGURE 6.
Figure 8:
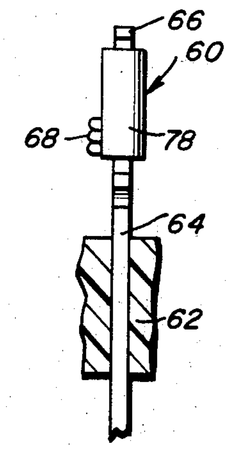
FIGURE 8 is an edge view of the construction of FIGURE 6.

As illustrated in FIGURES 7 and 9, the top and bottom edges of the circuit marker guard 60 are parallel to each other and parallel to the top and bottom surfaces of the terminal board 62 and may be considered to be horizontally disposed. The board 62 may be horizontally or vertically disposed depending on the mounting attitude of the block in the central office. However, the longitudinal axis of each of the tubular members 76 and 78 and the central longitudinal axis of the panel 74 is inclined in relation to the top and bottom surfaces of the circuit marker guard so that the tubular member 76 and 78 will be parallel with the inclined upper end portions 66 of the terminals 64 thereby facilitating insertion of the circuit marker guard onto the upper end portion 66 of the terminals 64 to protect the terminals and the wires 68 connected thereto and to mark circuits as desired by employing a shape sustaining plastic material of suitable color characteristics to enable identification of particular circuits.

In this construction, the angle of inclination and the over-all length of the circuit marker guard may vary depending upon the particular characteristics of the terminals with which the circuit marker guards are to be associated. Also, the end edges of the slit may be inclined or beveled to facilitate entry of the wires therein as the tubular members are being slid onto the terminals. The shape and size characteristics of the guard may vary depending upon the terminals with which the guard is to be associated. For example, the tubular members may be of any suitable shape including polygonal shape as well as circular as illustrated. Also, while the circuit marker guard has been specifically illustrated and described as being used with a pair of terminals, it can be made to accommodate any number of terminals.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A circuit marker guard for protectively covering and indicating a pair of terminals on a terminal block comprising a side wall, a plurality of walls extending laterally in substantial perpendicular relation to the side wall and oriented with the adjacent lateral walls spaced from each other, two of the laterally extending walls having a projecting flange extending toward two other laterally extending walls to define two passageways through the guard for receiving the terminals with the wires connected to the terminals adapted to pass between the free edges of the flanges and the corresponding laterally extending walls toward which the flanges extend, each of the laterally extending walls toward which the flanges extend having a laterally extending lip extending toward the flanges and disposed in underlying relation to the free edge of the flanges whereby the wires extending into the passageways and connected to the terminals will be frictionally gripped between the free edge of the flanges and the lips, each of said flanges has beveled corners at each end of the free edge thereof to form a camming engagement with the wires when the guard is forced downwardly over the terminals to cam the flanges outwardly into engagement with the outer surface of the wires.

2. The structure as defined in claim 1 wherein said guard is constructed of one-piece substantially rigid material with the spacing between adjacent laterally extending walls providing flexibility to the first mentioned wall.

3. The structure as defined in claim 2 wherein the first mentioned wall is normally arcuately curved with the outer-most laterally extending walls converging toward each other in a normal condition so that when the guard is mounted on a pair of terminals, the first mentioned wall will be straightened and the converging laterally extending walls will be oriented parallel to each other for frictionally gripping the remote edges of a pair of terminals.

4. A circuit marker guard for protectively covering at least one terminal on a terminal block comprising a wall having a plurality of tubular structures thereon, said tubular structures each having a longitudinal opening formed therein for enabling the tubular structures to be pushed into telescoping relation with said terminals and frictionally retained thereby with the wires connected to the terminals passing out through the openings in the tubular structures, said plurality of tubular structures being provided integral with the wall, said openings formed therein being in the form of longitudinal slits, said wall being substantially tangential to each of said tubular structures with each said slit being spaced circumferentially from the wall, said tubular structures further being parallel to each other and in acute angular relation to the upper and lower edges of the connecting wall whereby the circuit marker guard can be applied to the terminals of a terminal block which are inclined in relation to the upper surface of the block.

5. The structure as defined in claim 4, wherein said circuit marker guard is constructed of one-piece plastic material having distinguishable color characteristics for marking the terminals with which the marker guard is associated.

6. A circuit marker guard for protectively covering and indicating a pair of terminals on a terminal block comprising a sidewall, a plurality of walls extending laterally in substantial perpendicular relation to the sidewall and oriented with the adjacent lateral walls spaced from each other, two of the laterally extending walls having a projecting flange extending toward two other laterally extending walls to define two passageways through the guard for receiving the terminals with the wires connected to the terminals adapted to pass between the free edges of the flanges and the corresponding laterally extending walls toward which the flanges extend, each said flanges having beveled corners at each end of the free edge thereof to form a camming engagement with the wires when the guard is forced downwardly over the terminals to cam the flanges outwardly into engagement with the outer surfaces of the wires.

7. The structure as defined in claim 6 wherein said guard is constructed of one-piece substantially rigid material with the spacing between adjacent laterally extending walls providing flexibility to the first mentioned wall.

8. The structure as defined in claim 7 wherein the first mentioned wall is normally arcuately curved with the outermost laterally extending walls converging toward each other in a normal condition so that when the guard is mounted on a pair of terminals, the first mentioned wall will be straightened and the converging laterally extending walls will be oriented parallel to each other for frictionally gripping the remote edges of a pair of terminals.

9. A circuit marker guard for protectively covering at least one terminal on a terminal block comprising a wall having a plurality of tubular structures thereon, said tubular structures each having a longitudinal opening formed therein for enabling the tubular structures to be pushed into telescoping relation with said terminals and frictionally retained thereby with the wires connected to the terminals passing out through the openings in the tubular structures, said tubular structures being parallel to each other and in acute angular relation to the upper and lower edges of the connecting wall whereby the circuit marker guard can be applied to the terminals of a terminal block which is inclined in relation to the upper surface of the block.

10. The structure as defined in claim 9 wherein said circuit marker guard is constructed of one-piece plastic material having distinguishable color characteristics for marking the terminals with which the marker guard is associated.

References Cited

UNITED STATES PATENTS

| | | | |
|---|---|---|---|
| 2,740,001 | 3/1956 | Vergilio et al. | 174—138.4 |
| 3,118,017 | 1/1964 | Wimbish | 174—97 |
| 3,173,987 | 3/1965 | Potruch | 174—40.1 X |

FOREIGN PATENTS

| | | |
|---|---|---|
| 977,878 | 11/1950 | France. |
| 1,135,514 | 12/1956 | France. |
| 1,236,656 | 6/1960 | France. |

OTHER REFERENCES

German printed application No. 1,108,287, published June 8, 1961.

LARAMIE E. ASKIN, *Primary Examiner.*